United States Patent Office 3,370,089
Patented Feb. 20, 1968

3,370,089
PHOSPHONITRILE
Bernard Grushkin, Silver Spring, Md., assignor to
W. R. Grace & Co., New York, N.Y., a corporation of Connecticut
No Drawing. Filed July 9, 1964, Ser. No. 381,519
1 Claim. (Cl. 260—551)

ABSTRACT OF THE DISCLOSURE

An organic substituted trimeric phosphonitrilic compound in which the substituted alkyl group may contain from 1 to 3 carbon atoms This compound can be polymerized to form high temperature resistant semi-inorganic resins and ceramic type materials.

The present invention relates to novel phosphonitrilic derivatives, and more specifically to an organic substituted trimeric phosphonitrilic compound which may be polymerized to form novel high temperature resistant semi-inorganic resins, and ceramic type materials.

It has been shown that cyclic trimeric phenyl substituted phosphonitrilic chlorides having the formula

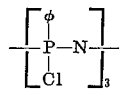

may be treated with ammonia to obtain the corresponding amido derivative having the formula

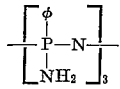

This ammoniated derivative may be deaminated at elevated temperatures to obtain a highly crosslinked inorganic type polymer which is resistant to high temperatures but which is highly insoluble and difficult to work.

To modify the ultimate properties of inorganic type polymers and thereby extend the applications and utilities therefor, it is frequently desirable to introduce organic type linkages into a basically inorganic polymer system.

It is therefore an object of the present invention to provide a novel organic modified phosphonitrilic polymer intermediate having specific utility in the preparation of high temperature semi-inorganic polymer systems.

It is another object to provide a novel organic modified phosphonitrilic polymer.

It is a further object to provide novel filled organic modified phosphonitrilic polymer compositions which may be molded and cured to form high temperature resistant articles.

It is still another object to provide useful ceramic type articles prepared from the present novel filled organic modified phosphonitrilic resins.

These and still further objects of the present invention will become readily apparent to one skilled in the art from the following detailed description and/or specific examples.

Broadly, the present invention contemplates a compound of the following formula:

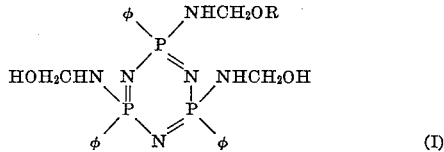

wherein R is lower alkyl having 1-3 carbon atoms, i.e., methyl, ethyl, propyl, or isopropyl, which may be polymerized at high temperatures to obtain novel polymers which contain the following type linkages:

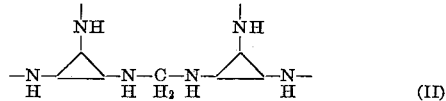

or

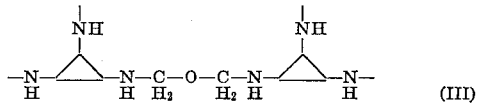

or both.

In the above structural Formulas II and III, and frequently herein after, the symbol

will be used to designate this cis and trans-2,4,6-triphenyl-triphophonitrile ring containing 3 open valences.

The 2 type linkages II and III and the trifunctional character of I lead to the formation of a polymer which contains the following repeating units:

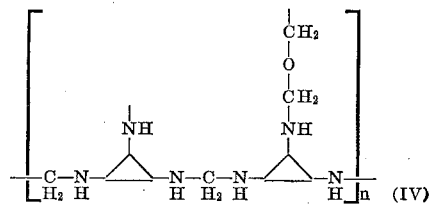 (IV)

or

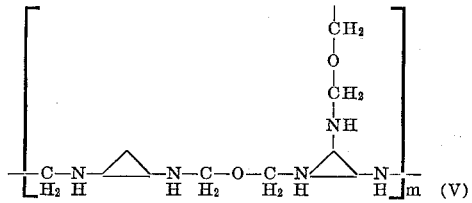 (V)

or both, wherein n and m have values of from about 2 to about 11.

More specifically, I have found that good yields of Compound I may be prepared by reacting cis and/or trans-2,4,6-triphenyl-2,4,6,-triaminotriphosphonitrile with formaldehyde (or a formaldehyde yielding compound) in the presence of a lower aliphatic alcohol, such as ethanol. Compound I may then be heated to a temperature of about 200° C. to obtain a crosslinked polymer containing the repeating units illustrated as IV or V above and having a molecular weight of from about 3000 to about 5000. These polymers can be used to fabricate parts which are stable at temperatures up to about 400° C.

Typically (but not exclusively) the polymers prepared by the practice of the present invention may be illustrated as 6 membered units having the following general structure:

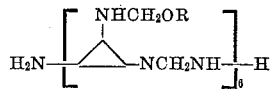

in which R is hydrogen, methyl, ethyl, propyl, isopropyl, or mixtures of hydrogen and one of the lower alkyl group, depending upon the alcohol employed in the reaction.

In view of the fact that the present polymers may possess two types of linkages, and the inorganic monomer unit is trifunctional, it is obvious that the present polymers comprise a mixture of polymeric structures, all of which cannot be illustrated herein.

However, all of the present polymers may be defined as (1) being polymers formed by the self-condensation of monomeric Compound I, (2) containing repeating units IV and V, and (3) having a molecular weight of from about 3000 to about 5000.

Compound I above is prepared by reacting cis or trans-2,4,6-triphenyl-2,4,6-triaminotriphosphonitrile with formaldehyde (or a formaldehyde source) in the presence of lower alkanol, ethanol at a temperature of from about 60 to about 80° C. The 2,4,6-trichloro-2,4,6-triaminotriphosphonitrile used in the practice of the present invention may be conveniently obtained by ammoniating 2,4,6-trichloro-2,4,6-triphenyltriphosphonitrile with an excess of ammonia at about room temperature and preferably in the presence of an inert solvent such as chloroform. The 2,4,6-trichloro-2,4,6-triphenyltriphosphonitrile may be obtained by reacting phenyltetrachlorophosphorane with ammonium chloride in the presence of an inert solvent at elevated temperatures ranging from about 130–160° C.

To prepare Compound I above, from about 3 to about 4 moles of formaldehyde (or the equivalent amount of a formaldehyde yielding source) is admixed with each mole of 2,4,6-triamino-2,4,6-triphenyltriphosphonitrile in lower alkanol. Ideally, but not necessarily, from about 10 to about 100 parts by weight of alkanol per part by weight reactants, are used in preparing the reaction mixture. The reaction mixture is adjusted in pH to about 5 to about 8 by the addition of an inorganic base such as sodium hydroxide. The presence of water in the reaction mixture does not alter the course of the reaction and from about 0.2 to about 0.8 part by weight water per part by weight of reactants in the reaction mixture may be tolerated. Frequently, this water will be present along with the formaldehyde when an aqueous solution of formaldehyde is used.

The reaction mixture may be conveniently heated to reflux at about 64–98° C. and heating continued thereat for a period of about 1 to about 3 hours to obtain substantial yields of the desired product I. As indicated above, the formaldehyde used in the present reaction may be standard 37% by weight aqueous formaldehyde solution, or may constitute an equivalent amount of formaldehyde yielding material such as paraformaldehyde or hexamethylenetetramine.

Subsequent to reaction, the desired product I is recovered by vacuum distillation of the solvent. The resultant product is recovered in the form of a solid which has a melting point of from about 112 to about 160° C. and an elemental analysis and molecular weight which indicates the compound of structure I given above.

Compound I obtained in the above procedure, may be converted into a useful semi-inorganic polymer by heating to a temperature in the range of from about 190 to about 230° C. A heating period of from about 1 to about 2 hours at the above temperature yields a soluble resin which possesses a molecular weight of from about 3000 to about 5000. This resin is then subsequently heated to a temperature of about 250 to about 280° C. and a cured resinous material is obtained which will not lose weight until heated to a temperature in excess of 400° C.

Preferably, but not necessarily, the curing of the present resins may be advantageously carried out in the presence of hexamethylenetetramine. The presence of the hexamethylenetetramine insures that methylol substitution and crosslinking resulting therefrom, is complete in the final resinous material. The presence of hexamethylenetetramine however, is not absolutely essential, and depending upon the degree of methylol substitution obtained in the preparation of Compound I above, excess hexamethylenetetramine may not be necessary for complete polymerization of the material.

It is frequently found that the present polymer illustrated as containing repeating units IV and V may be advantageously filled with inorganic materials such as silica, glass wool, vermiculite, asbestos, metal chips and so forth. Frequently it is found that from about 1 to about 4 parts by weight of filler may be incorporated per part by weight of resin. The filler is incorporated in the resin by mutually grinding the partially cured product, that is the resin obtained by heating Compound I to a temperature of from about 190 to about 230° C., and subsequently carrying out a post curing step under pressure at a temperature of from about 250 to about 280° C. Pressures on the order of from about 1000 to about 3000 lbs. per sq. in. may be advantageously used during the final curing steps. This curing, in the presence of filler, takes about 2 to about 10 hours at a temperature of from about 190 to about 280° C. The filled resin obtained by this process remains stable at temperatures up to about 400° C. The cured articles are tough, dense and extremely stable to atmospheric conditions.

The molded filled articles containing silica, glass wool, vermiculite or asbestos obtained above may be subsequently fired at temperatures ranging from about 800 to about 1000° C. to obtain ceramic type materials which possess valuable high temperature resistant properties. Depending on the size of the article prepared, it was found that firing times of from about 4 to about 10 hours produce the desired results. Ceramic materials which contain from about 50 to about 80 parts by weight of silica in the initial resin-filler composition, produce ceramic articles having particularly good thermal and mechanical properties.

Having described the basic aspects of the present invention, the following examples are given to illustrate embodiments thereof.

EXAMPLE I

A 10 g. (24.1 mmoles) sample of trans-2,4,6-triphenyl-2,4,6-triaminotriphosphonitrile was dissolved in 750 ml. of ethanol. The temperature of this mixture was raised to 55° C. and 5.9 g. of 37% by weight aqueous formaldehyde (72.3 mmoles) was added. The pH of the solution, which was initially 5, was adjusted to 8 by the addition of sodium hydroxide. A total of 50 ml. of water was present in the solution. The solution was then heated to reflux at 75–80° C. and held thereat for 2 hours. The resultant product was subjected to vacuum distillation until no more solvent was removed. In this manner 11.1 g. of the product having the following elemental analysis was prepared: C, 52.12; H, 5.80; N, 16.48; P, 17.57; O, 8.03%. The empirical formula was determined to be C, 22.92; H, 30.42; P, 3.00; N, 6.24; O, 2.65; which corresponded very well to the Formula I ($R=C_2H_5$) given above. The calculated molecular weight is 532. The determined molecular weight was 586.

EXAMPLE II

A 3.0 g. sample of Compound I obtained in Example I was heated to 230° C. for 3 hours. During the heating step, mainly ethanol and water evolved from the reaction mixture. The polymer obtained by this process possessed a molecular weight of 3400 and was deemed to be comprised of repeating structural units IV and V illustrated above.

EXAMPLE III 2.6 g. of the polymer obtained in Example II was admixed with 7.4 g. each of silica fiber and glass wool. Samples were cured at 280° C. for 3 hours in a mold at a pressure of 2000 p.s.i. The resultant samples had a hard dense appearance and did not lose weight until heated above 400° C.

EXAMPLE IV

The filled articles obtained in Example III were fired at a temperature of 950° C. After firing for a period of 8 hours, hard ceramic articles were obtained which possessed good thermal and mechanical properties.

EXAMPLE V 3.0 g. of polymer obtained in Example II was mixed with 7.0 g. of finely divided expanded vermiculite in a ball mill. A molding was made from the mixture by compressing the mixture at 2500 p.s.i. and subjecting it to a temperature of 280° C. for 3 hours. A hard dense piece resulted.

This was subsequently fired at 1000° C. to give a hard, dense ceramic material.

The above examples clearly illustrate that useful semi-inorganic polymers may be obtained in accordance with the teachings and examples set forth herein.

I claim:
1. A compound of the formula

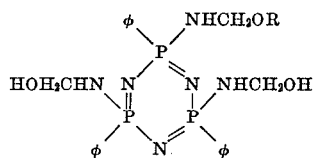

in which R is a lower alkyl group containing from 1 to 3 carbon atoms.

References Cited

FOREIGN PATENTS 1,167,050  11/1958  France.

JOHN D. RANDOLPH, *Primary Examiner.*

WALTER A. MODANCE, *Examiner.*

H. I. MOATZ, *Assistant Examiner.*